United States Patent
Ostrowski et al.

(10) Patent No.: US 6,673,972 B2
(45) Date of Patent: Jan. 6, 2004

(54) METHOD FOR PRODUCING POLYETHERPOLYOLS IN THE PRESENCE OF A MULTI-METAL CYANIDE COMPLEX CATALYST

(75) Inventors: Thomas Ostrowski, Castrop-Rauxel (DE); Kathrin Harre, Dresden (DE); Peter Zehner, Ludwigshafen (DE); Jörn Müller, Ludwigshafen (DE); Dieter Stützer, Dudenhofen (DE); Georg Heinrich Grosch, Bad Dürkheim (DE); Jürgen Winkler, Schwarzheide (DE); Stephan Bauer, Ostercappeln (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/169,683

(22) PCT Filed: Feb. 22, 2001

(86) PCT No.: PCT/EP01/02033
§ 371 (c)(1), (2), (4) Date: Jul. 5, 2002

(87) PCT Pub. No.: WO01/62826
PCT Pub. Date: Aug. 30, 2001

(65) Prior Publication Data
US 2003/0004378 A1 Jan. 2, 2003

(30) Foreign Application Priority Data
Feb. 24, 2000 (DE) .......................................... 100 08 630

(51) Int. Cl.$^7$ ............................................... C07C 43/11

(52) U.S. Cl. ....................................... 568/620; 422/198
(58) Field of Search ........................... 568/620; 422/198

(56) References Cited

U.S. PATENT DOCUMENTS

| | | | | |
|---|---|---|---|---|
| 4,234,560 A | * | 11/1980 | Kuerten et al. ............. | 423/659 |
| 4,683,122 A | * | 7/1987 | Concordia et al. .......... | 422/227 |
| 5,159,092 A | * | 10/1992 | Leuteritz .................... | 554/149 |
| 5,387,396 A | | 2/1995 | Dallmeyer et al. ......... | 422/106 |
| 5,811,595 A | | 9/1998 | Ellis .......................... | 568/620 |

FOREIGN PATENT DOCUMENTS

| | | | | |
|---|---|---|---|---|
| DE | 19854637 | | 5/2000 | ............ B01J/10/00 |
| EP | 0 263 935 | B1 | 4/1988 | ............ B01J/19/18 |
| EP | 0 419 419 | A1 | 3/1991 | ............ C07C/41/03 |
| EP | 0 850 954 | A1 | 7/1998 | ............ C08F/2/00 |

* cited by examiner

Primary Examiner—Rosalynd Keys
(74) Attorney, Agent, or Firm—Fernando A. Borrego

(57) ABSTRACT

Polyetherpolyols are prepared by reacting diols or polyols with ethylene oxide, propylene oxide, butylene oxide or a mixture thereof in the presence of a multimetal cyanide complex catalyst by a process which is carried out in a vertical upright cylindrical reactor comprising a jet nozzle which is arranged in the upper reactor region and is directed downward and via which the starting materials and the reaction mixture are fed in, and comprising a take-off, preferably in the lower reactor region, via which the reaction mixture is fed back to the jet nozzle in an external circulation by means of a pump via an equilibration container, comprising a concentric guide tube which extends over the total length of the reactor, except for the reactor ends, and comprising a heat exchanger integrated in the annular space.

14 Claims, No Drawings

METHOD FOR PRODUCING POLYETHERPOLYOLS IN THE PRESENCE OF A MULTI-METAL CYANIDE COMPLEX CATALYST

The present invention relates to a process for the preparation of polyetherpolyols.

Polyetherpolyols are provided in large amounts, in particular for the preparation of polyurethane foams. In the known preparation processes, polyetherpolyols are prepared as a rule from alkylene oxides in the presence of a short-chain initiator using different catalysts, such as bases, hydrophobized double-layer hydroxides, acidic or Lewis acid systems, organometallic compounds or multimetal cyanide complexes.

Heterogeneous multimetal cyanide complex catalysts are highly selective and active catalysts which are suitable in particular for the preparation of flexible foam polyetherpolyols, in which a high molecular weight has to be achieved and in which long oxalkylation times are required. By using multimetal cyanide complex catalysts, the production costs can be reduced and at the same time high-quality polyetherpolyol, which can be further processed to give low-odor and hence high-quality polyurethane foams, can be obtained. It is known from the literature that secondary reactions which may lead to the formation of odor substances and unsaturated components scarcely occur.

However, the high activity has the result that the heat of reaction cannot be removed in conventional reactors. If the polyetherpolyol preparation catalyzed via a multimetal cyanide complex is carried out in standard stirred kettles, the metering rates of alkylene oxide are limited by the heat removal capacity of the heat exchanger.

U.S. Pat. No. 5,811,595 proposes an ideally mixed reactor having one or two heat exchangers, the polyetherpolyol being fed into the circulation stream of the heat exchanger and the ethylene oxide into the reactor. Mixing of the ethylene oxide with the liquid phase is achieved by means of a nozzle.

The high circulation rate required for maintaining the high heat removal capacity and the danger of mechanical damage to the heterogeneous catalyst by the pump are disadvantageous in this process. Moreover, the highly reactive ethylene oxide is introduced into the reactor in which, owing to the cooling coils used, in particular at low degrees of filling, and owing to the small exchange area, the heat removal is very poor. Overheating due to the high reaction rate can occur, resulting in damage to the product. This may be reinforced by the poor mixing in the reactor.

EP-A-0 850 954 describes a process in which the reaction takes place in the gas space above the reaction liquid. The polyetherpolyol is circulated via a heat exchanger by means of a pump and is fed in through nozzles. This results in a large liquid surface. At the same time, ethylene oxide and polyetherpolyol are metered in via nozzles. The large surface results in good mass transfer and hence high reaction rates.

Owing to the high reaction rate which can be achieved using this process, local excess temperatures in the individual droplets are to be expected, which in turn result in damage to the product. Here too, the high circulation rate required for heat removal is not unproblematic for the heterogeneously dispersed multimetal cyanide complex catalyst, and the danger of damage cannot be ruled out.

The artificially enlarged gas phase furthermore constitutes a potential danger, in particular in the case of the ethoxylation, since free alkylene oxide is present in the gas phase. Ethylene oxide tends toward gas phase decomposition, which may lead to bursting of the reactor. On the other hand, when the polyetherpolyol or ethylene oxide is passed into the liquid, rapid reaction of the alkylene oxide is likely owing to the active multimetal cyanide complex.

EP-A-0 419 419 proposes a jet loop reactor, i.e. a reactor having internal loop flow and external pumped circulation, for alkoxylation of alcohols having a low functionality with ethylene oxide. However, the high reaction temperatures of 165° C. and the low functionalities result in low viscosities of the reaction mixture.

It is an object of the present invention to provide a process employing simple apparatus for the preparation of polyetherpolyols in the presence of multimetal cyanide complex catalysts with improvement of the space-time yield and avoidance of local overheating and hence a higher degree of secondary reactions, thus ensuring a high product quality.

We have found that this object is achieved by a process for the preparation of polyetherpolyols by reacting diols or polyols with ethylene oxide, propylene oxide, butylene oxide or a mixture thereof in the presence of a multimetal cyanide complex catalyst.

In the invention, the reaction is carried out in a reactor of upright cylindrical design, comprising a jet nozzle which is arranged in the upper reactor region and is directed downward and via which the starting materials and the reaction mixture are fed in, and comprising a take-off, preferably in the lower reactor region, via which the reaction mixture is fed back to the jet nozzle in an external circulation by means of a pump via an equilibration container, comprising a concentric guide tube which extends over the total length of the reactor, except for the reactor ends, and comprising a heat exchanger integrated in the annular space.

The vertical, upright cylindrical reactor described in EP-A-0 419 419 was developed in particular for low-viscosity liquid reaction mixtures, i.e. for liquids which have a viscosity substantially below 10 mPa·s under reaction conditions.

In comparison, the inventors of the present process have surprisingly found that the reactor type disclosed in EP-A-0 419 419 can also be used for more highly viscous reaction media, such as the polyetherpolyols of the present invention. As a rule, polyetherpolyols have high viscosities, approximately in the range from 80 to 1500 mPa·s at room temperature and still above 20 mPa·s, frequently above 100 mPa·s, under reaction conditions (from about 100 to 130° C.). It is known that the boundary layer between heat exchanger and reaction mixture increases with increasing viscosity, with the result that the heat can be removed more and more poorly. According to the novel process, in spite of the high viscosity, it was surprisingly possible to achieve sufficient heat removal, so that high alkylene oxide metering rates could be realized, resulting in an improved space-time yield and hence higher productivity and good product quality. Local excess temperatures which might lead to damage to the product were avoided.

Moreover, in the reaction procedure with external pump circulation, deposition of catalyst in the external pump circulation and damage to the catalyst by the pump would have been expected, with the result that the reaction would be slowed down since, owing to the low catalyst concentrations of less than 500 ppm used, even small losses of catalyst could lead to a considerable loss of activity. Furthermore, owing to the external pump circulation, a shift in the molecular weight distribution would have been expected since part of the product always remains in the external circulation. Contrary to expectation, the disadvantages mentioned were not observed and, on the contrary, a product having low dispersity of the molar mass distribution, i.e. having excellent product quality, was obtained.

In reactors equipped with heat exchanger plates, there is the danger that heterogeneous catalyst will settle in corners, angles and other areas with insufficient flow and consequently would no longer be available for the catalytic reaction or would be available only to an insufficient extent. This problem is not quite so critical at relatively high catalyst concentrations because a catalyst loss in this case does not have an extreme effect on the quality of the catalysis and of the products. On the other hand, at low catalyst concentrations, for example 100 ppm or less, the loss of available catalyst of the order of magnitude of only a few 10 ppm constitutes a dramatic absolute loss of catalyst material and hence of catalyst activity. The consequence is substantially poorer product quality, broader molecular weight distribution and high molecular weight fractions. In contrast, it was surprisingly found that, in the novel process, in spite of very low catalyst concentrations, such problems did not occur and there was no deterioration in the product quality.

According to the invention, diols or polyols are fed together with ethylene oxide, propylene oxide, butylene oxide or a mixture thereof, in the presence of a multimetal cyanide complex catalyst, to a vertical, upright cylindrical reactor comprising heat exchanger plates through which a heat-exchange medium flows, via a jet nozzle which is arranged in the upper reactor region and is directed downward, and is fed back to the jet nozzle via a take-off preferably arranged in the lower reactor region, via an external circulation by means of a pump via an equilibration container.

The present invention has no restrictions with regard to the multimetal cyanide complex catalyst which can be used; it may be amorphous but is preferably at least partly, predominantly or completely crystalline. If necessary, the catalyst is supported.

Particularly preferred multimetal cyanide complex catalysts are those of the formula (I)

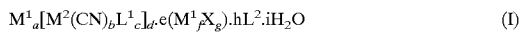
$$M^1_a[M^2(CN)_b L^1_c]_d \cdot e(M^1_f X_g) \cdot hL^2 \cdot iH_2O \qquad (I)$$

where $M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), Cd(II), Hg(II), Pd(I), Pt(II), V(III), Mg(II), Ca(II), Sr(II), Ba(II) and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II), $L^1$ is at least one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, aldehydes, ketones, ethers, polyethers, esters, urea derivatives, amides, nitrites and sulfides, a, b, d, e, f and g are integers or fractions greater than zero and c, h and i are integers or fractions greater than or equal to zero, a, b, c and d being chosen so that the electroneutrality condition is fulfilled and f and g have been chosen so that the electroneutrality condition is fulfilled, whose X-ray diffraction pattern has reflections at at least the d values 6.10 Å±0.04 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å if X is a formate anion, whose X-ray diffraction pattern has reflections at at least the d values 5.20 Å±0.02 Å
4.80 Å35 0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å if X is an acetate anion, and whose X-ray diffraction pattern has reflections at at least the d values 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å if X is a propionate anion, or which have a monoclinic crystal system if X is an acetate anion.

Such multimetal cyanide complex catalysts are described in DE-A-197 42 978.

A multimetal cyanide complex catalyst of the zinc-cobalt type is particularly preferably used.

The multimetal cyanide complex catalyst is preferably used in amounts of less than 250 ppm, particularly preferably less than 100 ppm, in particular less than 50 ppm, based on the mass of product to be produced.

According to the invention, the process is carried out in a vertical, upright cylindrical reactor comprising a jet nozzle which is arranged in the upper reactor region and is directed downward and via which the starting materials and the reaction mixture are fed in, and comprising a take-off, preferably in the lower reaction region, via which the reaction mixture is fed back to the jet nozzle in an external circulation by means of a pump via an equilibration container, comprising a concentric guide tube which extends over the total length of the reactor, except for the reactor ends, and comprising a heat exchanger integrated in the annular space.

Such a reactor is described, for example, in German Patent Application 19854637.8.

In such a reactor, an internal loop flow forms from top to bottom via the downward-directed jet nozzle in the guide tube and from bottom to top in the annular space between guide tube and reactor interior. The predominant part of the reaction mixture is conveyed in this internal loop flow and only a small fraction of the reaction mixture is pumped via the external circulation and ensures, via the jet nozzle, that the loop flow is driven.

The ratio of volume flow rates of internal loop flow to external pumped reaction mixture is from 2 to 30, preferably from 5 to 10.

The internal loop flow ensures ideal mixing with high temperature constancy and the absence of zones with alkylene concentration, where local excess temperatures might occur owing to the higher velocities. Moreover, by means of the heat exchanger integrated in the annular space, the heat of reaction is removed at its place of origin, resulting in a highly isothermal nature of the reaction, i.e. a very small temperature gradient over the reactor height. According to the novel process, restrictions of the reaction rate by mass transfer or heat transport can thus be virtually completely eliminated. Secondary reactions which are otherwise promoted by temperature gradients in the reaction system are virtually completely suppressed.

In the preferred process variant, in which the predominant part of the reaction mixture is conveyed in the internal loop flow and only a small fraction of the reaction mixture is pumped externally, substantially smaller amounts of catalyst are circulated per unit time via the circulation pump. This leads to a reduction in the mechanical stress on the catalyst and hence to a longer life.

In a preferred embodiment, the concentric guide tube has a cross-sectional area of from ⅒ to half the cross-sectional area of the reactor. The jet nozzle is preferably arranged above the upper end of the guide tube, in particular from ⅛ of the guide tube diameter to one guide tube diameter away, or dips into the guide tube to a depth of up to several guide tube diameters.

As a rule, the guide tube is designed as a simple tube, but it is also possible to design the guide tube as a tubular plate-type heat exchanger or as a coiled cooling tube.

Preferably, an impact plate can be arranged in the reactor region below the lower end of the guide tube, preferably one guide tube diameter away. The impact plate, together with the concentric guide tube, stabilizes the internal loop flow in the reactor. In addition to flow reversal, the impact plate ensures that no gas bubbles are entrained into the external circulation and damage the pump.

The heat exchangers integrated in the annular space are preferably designed in such a way that as far as possible they do not hinder the internal loop flow and do not give rise to any turbulence. The heat exchangers used may be, for example, tubes through which a cooling medium flows and which are preferably arranged parallel to the reactor wall, plate-type heat exchangers which are likewise preferably parallel to the reactor wall, or boiling tubes closed at the bottom, i.e. field tubes as described, for example, in EP-A-2 630 135. When field tubes are used, it is possible to use the resulting vapor as process vapor.

The jet nozzle is preferably in the form of a single-material nozzle. In this process variant, only the liquid reaction mixture is sprayed in and gas, for example nitrogen, and alkylene oxides from the gas space above the liquid level are dispersed in the liquid reaction mixture. In addition, an apparatus for feeding in one or more gaseous reactants, preferably one or more, in particular from 1 to 3, annular tubes having a multiplicity of orifices, in particular distributed in the lower reactor region or over the reactor height, can be provided in the annular space between guide tube and reactor interior. The advantage of a single-material nozzle is its simple design.

In order to be able to take up the volume expansion of the reaction mixture as the reaction progresses, it is necessary to provide an equilibration container in the external circulation. The equilibration container used may be a static mixer or a stirred kettle, in which the reaction mixture is ideally mixed. At the beginning of the reaction, the equilibration container is empty and the initiator is initially taken together with the multimetal cyanide complex catalyst in the reactor. In order to reduce the cycle times, the initiation of the catalyst, i.e. the activation of the catalyst with the alkylene oxides, can be effected in a separate container. After the initiation, the active multimetal cyanide complex catalyst/initiator mixture can be further diluted without substantially reducing the activity of the catalyst. In order to be able to take up the volume expansion to 3 to 100, preferably 5 to 50, times the volume, which is to be expected in the case of flexible foam polyols, the container must be larger than the volume of the reactor by the appropriate factor. Owing to the high activity of the multimetal cyanide complex catalyst, there is unlikely to be any accumulation of alkylene oxide in the equilibration container since the alkylene oxide undergoes complete reaction in the reactor itself. The pressure in the equilibration container is kept constant by means of nitrogen. Removal of heat is not required since the heat is removed in the reactor itself. After the end of the alkoxidation, reactor and equilibration container are emptied and the product is further worked up.

The reaction in the reactor preferably takes place at from 90 to 200° C. and from 1 to 50 bar.

Particularly preferably, the reaction is carried out at from 110 to 140° C. and from 2 to 10 bar.

The power input is preferably from about 15 to 30 kW/l at the nozzle and from 3 to 10 kW/l in the total reaction system.

By dispersing the individual reactants and in combination with the other reaction parameters, thorough mixing of all components at low substrate concentrations and with high mass transfer coefficients and large volume-specific phase interfaces is achieved. The arrangement of heat exchangers in the annular space, preferably parallel to the reactor walls, results in virtually complete freedom from gradients in the reactor contents with respect to the reaction temperature. By avoiding local overheating, secondary reactions are substantially suppressed and catalyst deactivation is substantially avoided. Consequently, high space-time yields are achieved in combination with an improvement in the product quality.

The invention is explained in more detail below with reference to an embodiment.

EXAMPLE

A cylindrical reactor having a total volume of 12 $m^3$ was used, the guide tube having a length of 5.80 m and a diameter of 0.2 m. 460 field tubes having a length of 6.50 m and an external diameter of 3 cm were used as a heat exchanger in the annular space. 2.49 kg/s of propylene oxide and 0.2 kg/s of polyetherol having a molar mass of 400 g/mol were fed continuously to the reactor.

The preparation of the multimetal cyanide catalyst was carried out in a two-stage process in which first the acid and then the catalyst were obtained through precipitation. For this purpose, 7l of strongly acidic ion exchanger which was in the sodium form, i.e. Amberlite® 252 Na from Rohm & Haas, were introduced into an exchanger column having a length of 1 m and a volume of 7.7l. The ion exchanger was then converted into the acid form by passing 10% strength hydrochloric acid at a rate of 2 bed volumes per hour over the exchanger column for 9 hours until the sodium content in the discharge was <1 ppm. The ion exchanger was then washed with water. The regenerated ion exchanger was then used to prepare an essentially alkali-free hexacyanocobaltic acid. For this purpose, a 0.24 molar solution of potassium hexacyanocobaltate in water was passed over the ion exchanger at a rate of one bed volume per hour. After 2.5 bed volumes, a changeover was effected from the potassium hexacyanocobaltate solution to water. The 2.5 bed volumes obtained had on average a content of 4.5% by weight of hexacyanocobaltic acid and alkali contents of <1 ppm.

For the preparation of the catalyst, 8553.5 g of zinc acetate solution (content of zinc acetate dihydrate: 8.2% by weight, content of Pluronic® PE 6200, i.e. a block copolymer of ethylene oxide and propylene oxide, which was used for controlling the crystal morphology: 1.3% by weight) were then initially taken in a 20l reactor and heated to 60° C. while stirring. 9956 g of hexacyanocobaltic acid solution (cobalt content 9 g/l, content of Pluronic® PE 6200: 1.3% by weight) were then added in the course of 20 minutes at 60° C. with continuous stirring. The suspension obtained was stirred for a further 60 minutes at 60° C. Thereafter, the solid thus obtained was filtered off and was washed with 6 times the cake volume. The moist filter cake was then dispersed in polypropylene glycol having a molar mass of 400 g/mol.

The dispersion thus obtained was used as a catalyst. The catalyst concentration was 60 ppm and the reactor temperature could be kept constant at 125 ±0.2° C. over the complete reactor length. The average molar mass achieved was 5200 g/mol, and high molecular weight components were not detected. A maximum space-time yield of 807 kg/m³/h was achieved.

In an analogous comparative experiment in a 200 l stirred kettle reactor with external heat exchanger, a maximum space-time yield of 450 kg/m³/h was achieved at the same catalyst concentration, owing to the limited heat removal capacity. In both cases, a cycloacetal content of 0.04 ppm and a content of unsaturated components of 0.005 meq/g were achieved. Completely symmetrical molecular weight distribution was obtained.

In a comparative experiment under KOH catalysis (0.3% by mass), a space-time yield of 105 kg/m³/h was achieved in an analogous synthesis, the cycloacetal concentration was 4.8 ppm and the concentration of unsaturated components was 0.061 meq/g. Furthermore, high molecular weight components were detected.

The novel process thus permitted a significantly higher space-time yield with the same product quality.

The experiment was repeated using the reactor with equilibration container, the same product properties being obtained. The space-time yield was 790 kg/m³/h, without taking into account the times of loading and unloading the reactor.

We claim:

1. A process for the preparation of polyether polyols by reacting diols or polyols with ethylene oxide, propylene oxide, butylene oxide or a mixture thereof in the presence of a multimetal cyanide complex catalyst, wherein the reaction is carried out in a reactor of upright cylindrical design, comprising a jet nozzle which is arranged in the upper reactor region and is directed downward and via which the starting materials and the reaction mixture are fed in, and comprising a take-off, via which the reaction mixture is fed back to the jet nozzle in an external circulation via means of a pump via an equilibration container, comprising a concentric guide tube which extends over the total length of the reactor, except for the reactor ends, and comprising a heat exchanger integrated in the annular space.

2. A process as claimed in claim 1, wherein the concentric guide tube has a cross-sectional area of from 1/10 to half the cross-sectional area of the reactor and wherein the jet nozzle is arranged above the upper end of the guide tube, or dips into the guide tube to a depth of up to several guide tube diameters.

3. A process as claimed in claim 1 or 2, wherein the predominant part of the reaction mixture, corresponding to 2 to 30 times the volume flow of the externally circulated reaction mixture, flows in an internal loop flow through the guide tube from top to bottom and through the annular space between guide tube and reactor inner wall from bottom to top.

4. A process as claimed in claim 1, wherein the reaction is carried out at from 90 to 200° C. and from 1 to 50 bar.

5. A process as claimed in claim 1, wherein the reaction is carried out at from 110 to 140° C. and from 2 to 10 bar.

6. A process as claimed in claim 1, wherein the multimetal cyanide complex catalyst is used in a concentration of less than 250 ppm, preferably less than 100 ppm, more preferably less than 50 ppm, based on the mass of product to be produced.

7. A process as claimed in claim 1, wherein the jet nozzle is in the form of a single-material nozzle and wherein additionally, if required, an apparatus for feeding in one or more gaseous reactants, preferably one or more, in particular from 1 to 3, annular tubes having a multiplicity of orifices, in particular distributed in the lower reactor region or over the reactor height, is (are) provided in the annular space between guide tube and reactor inner wall.

8. A process as claimed in claim 1, wherein an impact plate is arranged in the reactor region below the lower end of the guide tube, preferably one guide tube diameter away.

9. A process as claimed in claim 1, wherein the multimetal cyanide complex catalyst is of the formula (I)

$$M^1_a[M^2(CN)_b L^1_c]_d \cdot e(M^1_f X_g) \cdot hL^2 \cdot iH_2O \qquad (I)$$

where $M^1$ is at least one element from the group consisting of Zn(II), Fe(II), Co(III), Ni(II), Mn(II), Co(II), Sn(II), Pb(II), Fe(III), Mo(IV), Mo(VI), Al(III), V(IV), V(V), Sr(II), W(IV), W(VI), Cu(II), Cd(II), Hg(II), Pd(II), Pt(II), V(III), Mg(II), Ca(II) Sr(II), Ba(II) and Cr(III), $M^2$ is at least one element from the group consisting of Fe(II), Fe(III), Co(III), Cr(III), Mn(II), Mn(III), Ir(III), Rh(III), Ru(II), V(IV), V(V), Co(II) and Cr(II), $L^1$ is at last one ligand from the group consisting of cyanide, carbonyl, cyanate, isocyanate, nitrile, thiocyanate and nitrosyl, X is a formate anion, acetate anion or propionate anion, $L^2$ is at least one water-miscible ligand from the group consisting of alcohols, aldehydes, ketones, ethers, polyethers, esters, urea derivatives, amides, nitriles and sulfides, a, b, d, e, f and g are integers or fractions greater than zero, c, h and i are integers or fractions greater than or equal to zero, a, b, c and d being chosen so that the electroneutrality condition is fulfilled and f and g have been chosen so that the electroneutrality condition is fulfilled, whose X-ray diffraction pattern has reflections at at least the d values 6.10 Å±0.04 Å
5.17 Å±0.04 Å
4.27 Å±0.02 Å
3.78 Å±0.02 Å
3.56 Å±0.02 Å
3.004 Å±0.007 Å
2.590 Å±0.006 Å
2.354 Å±0.004 Å
2.263 Å±0.004 Å if X is a formate anion, whose X-ray diffraction pattern has reflections at at least the d values 5.20 Å±0.02 Å
4.80 Å±0.02 Å
3.75 Å±0.02 Å
3.60 Å±0.02 Å
3.46 Å±0.01 Å
2.824 Å±0.008 Å
2.769 Å±0.008 Å
2.608 Å±0.007 Å
2.398 Å±0.006 Å if X is an acetate anion, and whose X-ray diffraction pattern has reflections at at least the d values 5.59 Å±0.05 Å
5.40 Å±0.04 Å
4.08 Å±0.02 Å
3.94 Å±0.02 Å
3.76 Å±0.02 Å
3.355 Å±0.008 Å
3.009 Å±0.007 Å
2.704 Å±0.006 Å
2.381 Å±0.004 Å if X is a propionate anion, or which have a monoclinic crystal system if X is an acetate anion.

10. A process as claimed in claim 1, wherein the multimetal cyanide complex catalyst is substantially or completely crystalline.

11. A process as claimed in claim 1, wherein a multimetal cyanide complex catalyst of the zinc-cobalt type is used.

12. A process as claimed in claim 1, wherein the take-off is arranged in the lower reactor region.

13. A process as claimed in claim 2, wherein the jet nozzle is arranged above the upper end of the guide tube from ⅛ of the guide tube diameter to one guide tube diameter away.

14. A process as claimed in claim 3, wherein the predominant part of the reaction mixture corresponds to 5 to 10 times the volume flow of the externally circulated reaction mixture.

* * * * *